United States Patent
Yohe et al.

(10) Patent No.: US 8,776,999 B2
(45) Date of Patent: Jul. 15, 2014

(54) ARTICULATING FRAME FOR CONTINUOUS CONVEYOR

(75) Inventors: Peter D. Yohe, Bloomsburg, PA (US); Ronald H. Cordingly, Berwick, PA (US); Thomas M. Zurewich, Orangeville, PA (US); Yakov Kushnir, Brooklyn, NY (US)

(73) Assignee: Dyco, Inc., Bloomsburg, PA (US)

( * ) Notice: Subject to any disclaimer, the term of this patent is extended or adjusted under 35 U.S.C. 154(b) by 564 days.

(21) Appl. No.: 13/234,804

(22) Filed: Sep. 16, 2011

(65) Prior Publication Data

US 2013/0068596 A1   Mar. 21, 2013

(51) Int. Cl.
*B65G 15/02* (2006.01)
*B65G 15/62* (2006.01)
*B65G 21/14* (2006.01)
*B65B 21/16* (2006.01)
*B65G 21/20* (2006.01)

(52) U.S. Cl.
CPC ............ *B65G 15/62* (2013.01); *B65G 15/02* (2013.01); *B65G 21/14* (2013.01); *B65B 21/16* (2013.01); *B65G 21/2072* (2013.01)
USPC ......... 198/861.2; 198/839; 198/841; 198/831

(58) Field of Classification Search
USPC ............................ 198/861.2, 839, 841, 831
See application file for complete search history.

(56) References Cited

U.S. PATENT DOCUMENTS

| | | | |
|---|---|---|---|
| 3,707,218 A | 12/1972 | Payne et al. | |
| 3,920,115 A * | 11/1975 | Craggs | 198/822 |
| 4,144,965 A | 3/1979 | Alldredge et al. | |
| 4,241,875 A | 12/1980 | Vandenbrink | |
| 4,449,665 A | 5/1984 | Goldfarb et al. | |
| 4,557,374 A | 12/1985 | Bode | |
| 4,844,238 A | 7/1989 | Lachner | |
| 4,934,517 A | 6/1990 | Lapeyre | |
| 5,163,545 A | 11/1992 | David | |
| 5,165,766 A | 11/1992 | Thomas | |
| 6,029,797 A | 2/2000 | Olsson | |
| 6,283,277 B1 | 9/2001 | Smith et al. | |
| 6,471,046 B2 | 10/2002 | Layne et al. | |
| 6,651,804 B2 | 11/2003 | Thomas et al. | |
| 6,761,265 B1 | 7/2004 | Dolan et al. | |
| 6,857,517 B2 | 2/2005 | Damkjaer | |
| 6,896,126 B2 | 5/2005 | Guldenfels | |
| 7,222,731 B2 * | 5/2007 | Taylor et al. | 198/861.2 |
| 7,438,180 B1 * | 10/2008 | Taylor et al. | 198/861.2 |

OTHER PUBLICATIONS

The Cincinnati Mine Machinery Co.—CC-622 Crawler Chain, 1 pg., http://www.intpipe.com/images/media/cincinnati_crawler_chain.jpg, accessed Jul. 21, 2011.

* cited by examiner

*Primary Examiner* — Mark A Deuble
(74) *Attorney, Agent, or Firm* — McNees Wallace & Nurick LLC

(57) ABSTRACT

The present invention relates to an apparatus having an articulating frame for conveying articles, as well as self-propelled articulating frames.

26 Claims, 11 Drawing Sheets

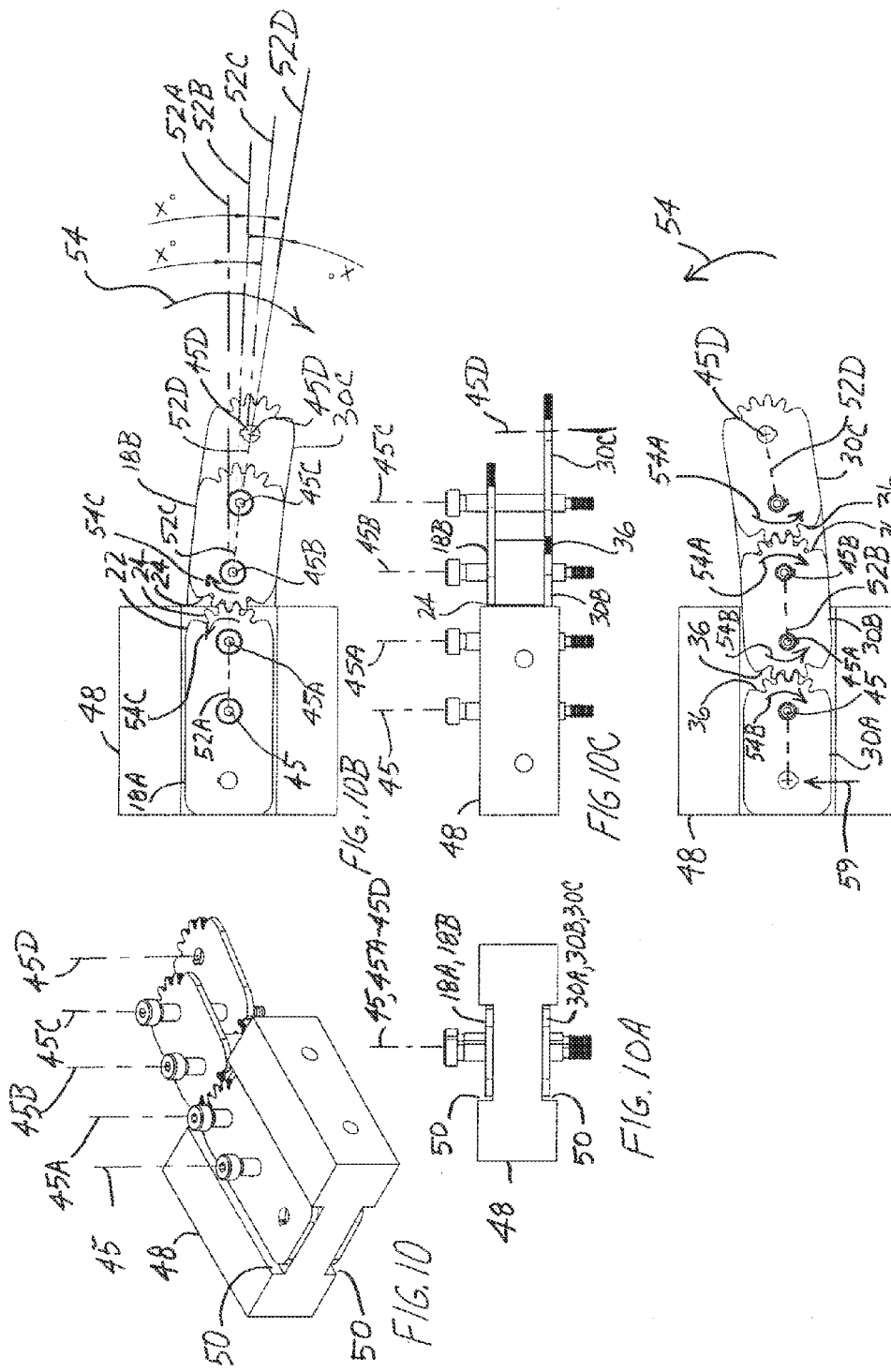

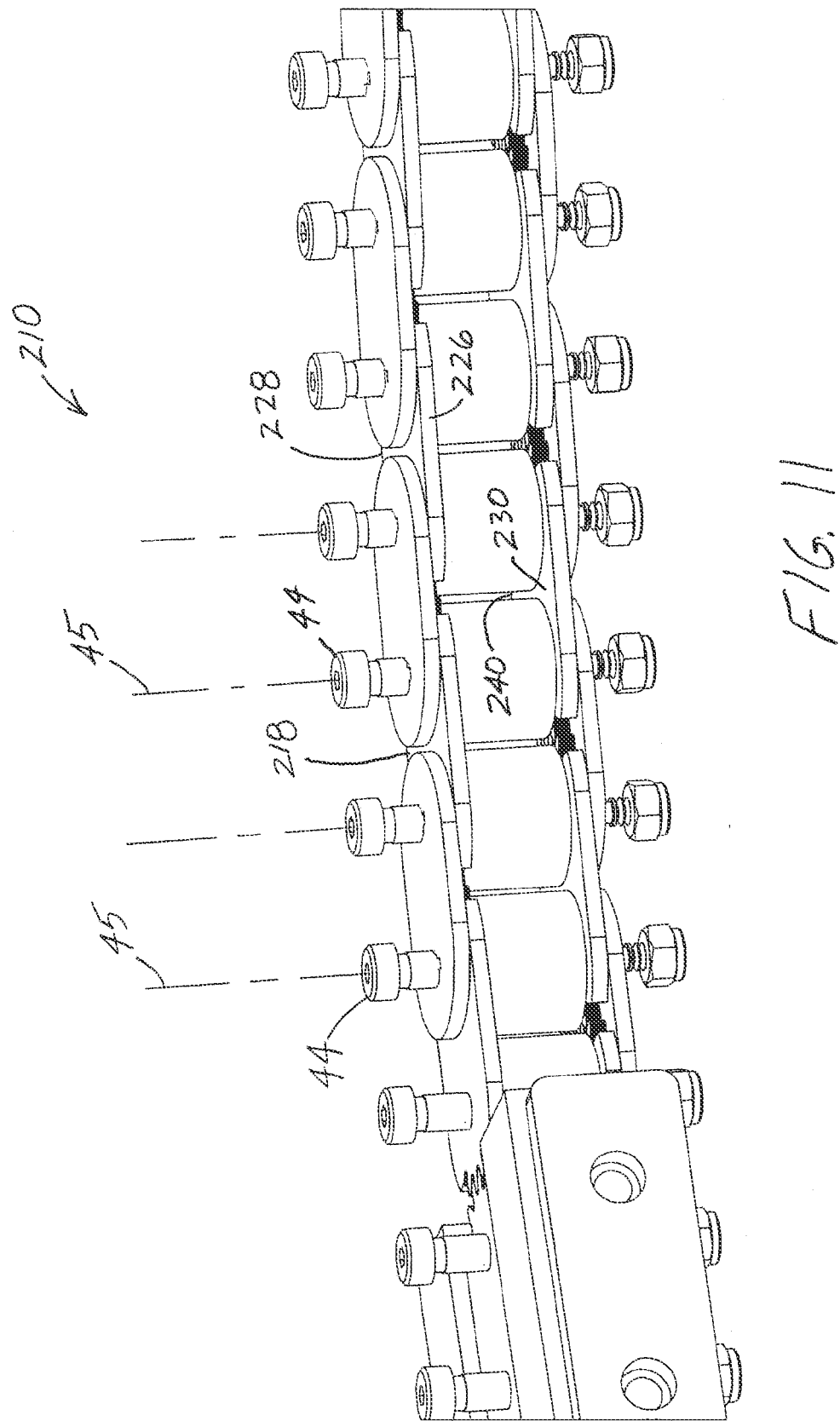

ARTICULATING FRAME FOR CONTINUOUS CONVEYOR

FIELD OF THE INVENTION

The present invention generally relates to an articulating frame. The present invention additionally relates to an articulating frame for use with a continuous conveyor.

BACKGROUND

In the manufacture and packaging of articles, such as blow-molded articles, including hollow, plastic containers or bottles, a conveyor arrangement is often used to convey the articles between the manufacturing/packaging stations. Conventional conveyor arrangements are immobile and typically require a sizable footprint of the facility that cannot be otherwise utilized. Additionally, handling of the same articles may be more efficiently achieved by re-routing the conveyor arrangement, such as when differently sized articles are processed, or to accommodate other processes.

Accordingly, there is a need for cost effective and operationally efficient flexible conveyance systems, permitting multipurpose arrangements associated with the manufacture and/or packaging of articles.

SUMMARY OF THE INVENTION

An exemplary embodiment of the present invention is directed to an articulating frame for supporting a continuous belt including a plurality of fasteners each having an axis that is substantially parallel with each other. A first link of a plurality of first links is provided, the first link having a first end and a second end, the first end configured to rotatably receive a fastener of the plurality of fasteners and the first end having an engagement feature formed therein. The second end is configured to rotatably receive a fastener of the plurality of fasteners that is adjacent to the fastener rotatably received by the first end. The second end has an engagement feature formed therein, the second end of a first link of the plurality of first links being engaged with a first end of an adjacent first link of the plurality of first links. A second link of a plurality of second links is provided, the second link having a third end and a fourth end. The third end is configured to rotatably receive a fastener of the plurality of fasteners and the third end having an engagement feature formed therein. The fourth end is configured to rotatably receive a fastener of the plurality of fasteners that is adjacent to the fastener rotatably received by the third end. The fourth end has an engagement feature formed therein, the fourth end of a second link of the plurality of second links being engaged with a third end of an adjacent second link of the plurality of second links. The plurality of first links overlap the plurality of second links such that an overlapping second end of a first link of the plurality of first links rotatably receives the same fastener of the plurality of fasteners as a corresponding third end of a second link of the plurality of second links. An overlapping first end of a first link of the plurality of first links rotatably receives the same fastener of the plurality of fasteners as a corresponding fourth end of a second link of the plurality of second links. The first link of the plurality of first links has a first surface and an opposed second surface. The second link of the plurality of the second links has a third surface and an opposed fourth surface, the fourth surface facing away from the first surface of the plurality of first links. At least a portion of the first surface of the first link of the plurality of first links and the fourth surface of the second link of the plurality of second links secures a conveyor retainer for supporting the continuous belt.

A further embodiment of the present invention is an articulating frame including a plurality of fasteners each having an axis that is substantially parallel with each other. A plurality of first links have a first end and a second end, the first end is configured to rotatably receive a fastener of the plurality of fasteners and the first end having an engagement feature formed therein. The second end is configured to rotatably receive a fastener of the plurality of fasteners that is adjacent to the fastener rotatably received by the first end. The second end has an engagement feature formed therein, the second end of a first link of the plurality of first links being engaged with a first end of an adjacent first link of the plurality of first links. A plurality of second links have a third end and a fourth end, the third end configured to rotatably receive a fastener of the plurality of fasteners and the third end having an engagement feature formed therein. The fourth end is configured to rotatably receive a fastener of the plurality of fasteners that is adjacent to the fastener rotatably received by the third end. The fourth end has an engagement feature formed therein, the fourth end of a second link of the plurality of second links being engaged with a third end of an adjacent second link of the plurality of second links. The plurality of first links overlap the plurality of second links such that an overlapping second end of a first link of the plurality of first links rotatably receive the same fastener of the plurality of fasteners as a corresponding third end of a second link of the plurality of second links. An overlapping first end of a first link of the plurality of first links rotatably receive the same fastener of the plurality of fasteners as a corresponding fourth end of a second link of the plurality of second links. The first link of the plurality of first links has a fifth surface and an opposed sixth surface, and the second link of the plurality of the second links has a seventh surface and an opposed eighth surface. The fifth surface and the seventh surface of the links face in substantially the same direction, and the sixth surface and the eighth surface of the links face in substantially the same direction.

A yet further embodiment of the present invention is a retention member for use with an articulating frame for supporting a continuous belt. The retention member includes a body having a receiving surface and being securable to a frame movable between a first position and a second position. The body includes a channel formed therein configured to support a continuous belt, the body including opposed flanges having facing protruding surfaces. In response to the frame being moved toward the first position, receiving surfaces of adjacent bodies are brought toward each other. One side of facing protruding surfaces of adjacent bodies form a first substantially continuous surface to slidably support the continuous belt. In response to the frame being moved toward the second position, receiving surfaces of adjacent bodies are brought toward each other. Opposite surfaces of facing protruding surfaces of adjacent bodies are associated with the first position of the frame forming a second substantially continuous surface to slidably support the continuous belt.

BRIEF DESCRIPTION OF THE DRAWINGS

Referring now to the figures, which are exemplary embodiments, and wherein the like elements are numbered alike:

FIGS. 10, 10A, 10B, 10C, 10D illustrate different views and operational framework of the frame of FIG. 1.

FIG. 11 illustrates an alternate embodiment of an articulating frame.

DETAILED DESCRIPTION

Figure 1:
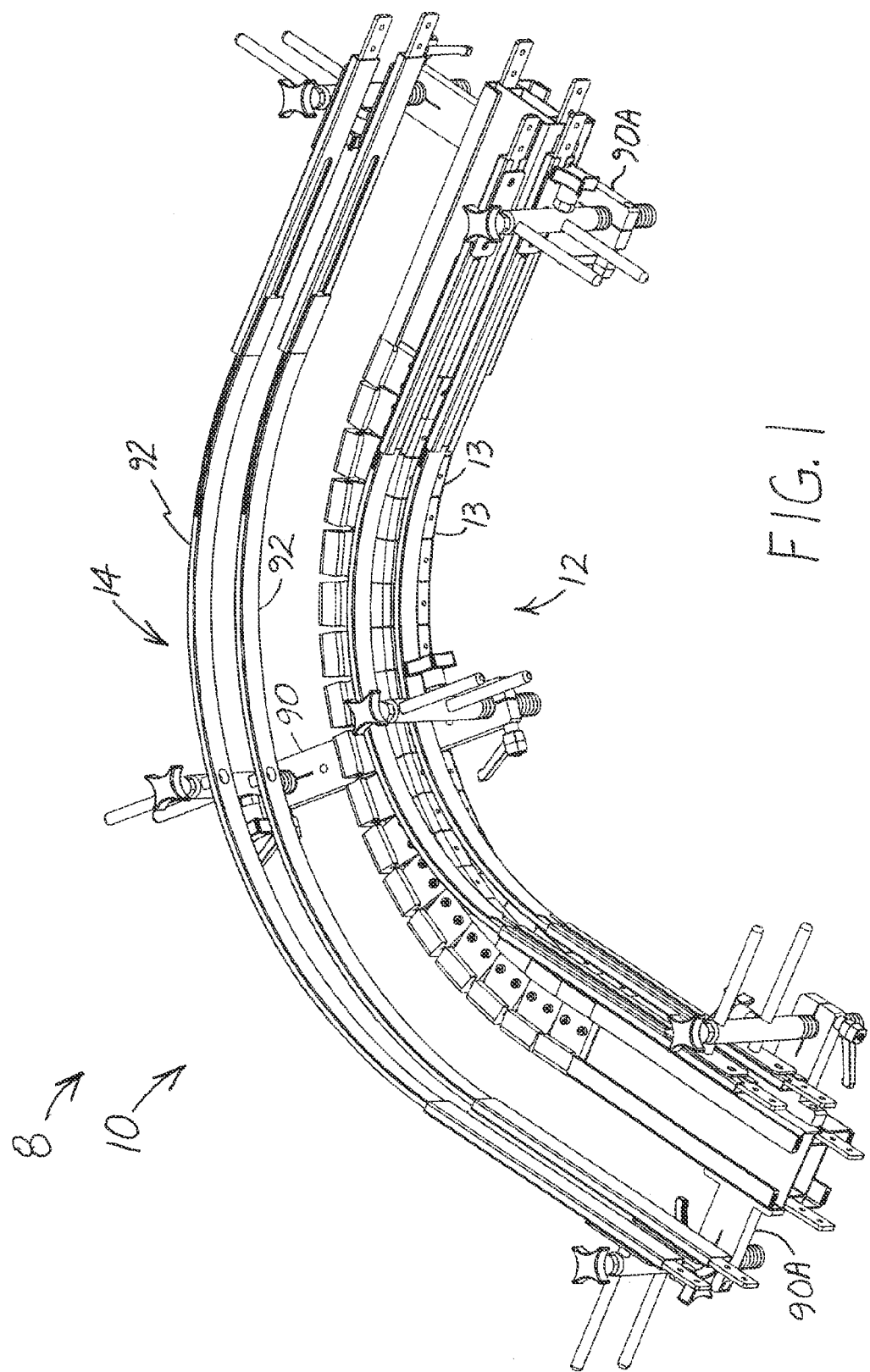
FIG. 1 illustrates an upper perspective view of an articulating frame according to an embodiment of the disclosure.

Specific embodiments of conveyance systems for conveying articles and articulating frames for conveying articles, as well as self-propelled articulating frames according to the invention are described below with reference to the drawings.

FIGS. 1-10 illustrate a portion of a conveyance system 8 for conveying articles, such as hollow containers (not shown) along the conveyance system during the manufacturing and/or handling of the articles. Conveyance system 8 includes an articulating frame 10 (FIGS. 3-4) that supports a conveyor retainer or retainer 12, which retainer 12 slidably secures a continuous belt 16 (one link of belt 16 shown in FIG. 2) extending over the retainer. Conveyance system 8 further includes a guide assembly 14 configured to guide articles movingly supported by belt 16.

As further shown FIGS. 3-4, 7, 10, 10A, 10B, 10C, 10D, articulating frame 10 includes a plurality of alternately overlapping first links 18, second links 30 and tertiary links 42 that collectively form an articulating chain. First links 18 have a first end 20 and a second end 22, with each end 20, 22 configured to rotatably receive a fastener 44 having a substantially parallel axis 45. As shown in the figures, first links 18 are arranged such that first ends 20 are in close proximity with second ends 22 of adjacent first links 18. Each end 20, 22 further includes an engagement feature 24, such as a gear so that engaged ends 20, 22 of adjacent first links 18 are urged to rotate in equal and opposite directions about respective axes 45 of fasteners 44.

Second links 30 have a third end 32 and a fourth end 34, with each end 32, 34 configured to rotatably receive a fastener 44 having a substantially parallel axis 45. As shown in the figures, second links 30 are arranged such that third ends 32 are in close proximity with fourth ends 34 of adjacent second links 30. Each end 32, 34 further includes an engagement feature 36, such as a gear so that engaged ends 32, 34 of adjacent second links 30 are urged to rotate in equal and opposite directions about respective axes 45 of fasteners 44.

Figure 2:
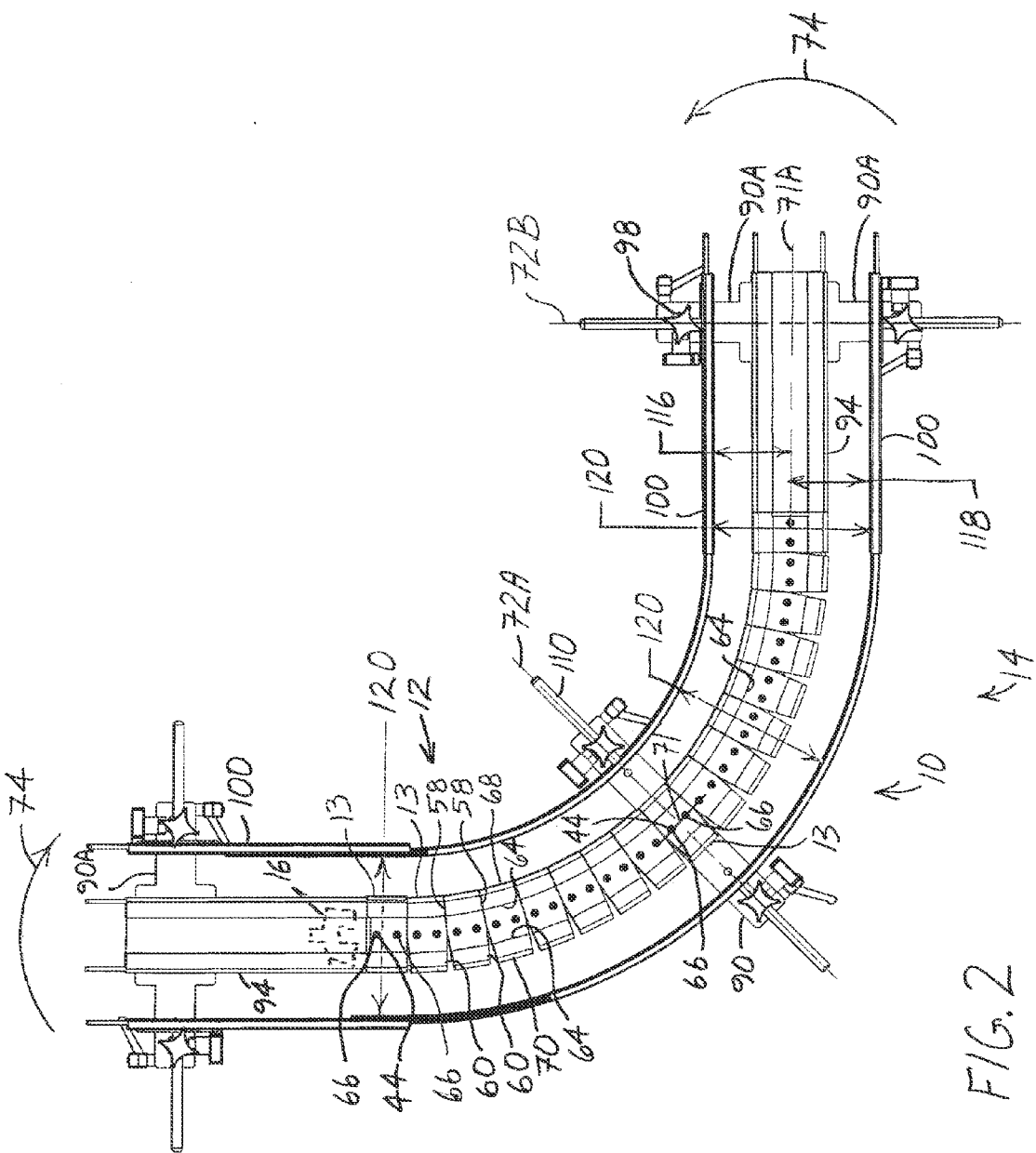
FIG. 2 illustrates a plan view of the frame of FIG. 1.
Figure 3:
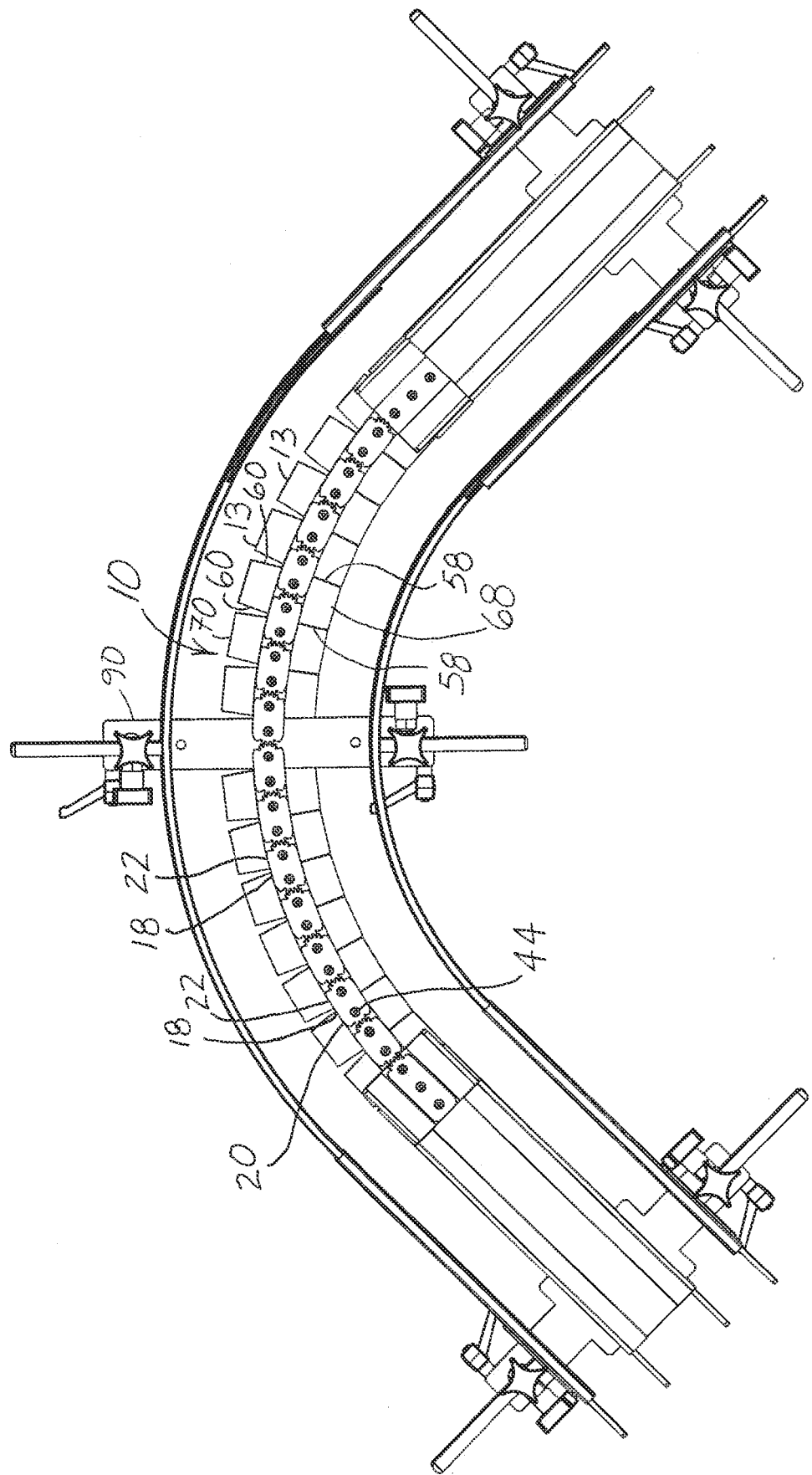
FIG. 3 illustrates a partial cutaway, plan view of the frame of FIG. 1.
Figure 4:
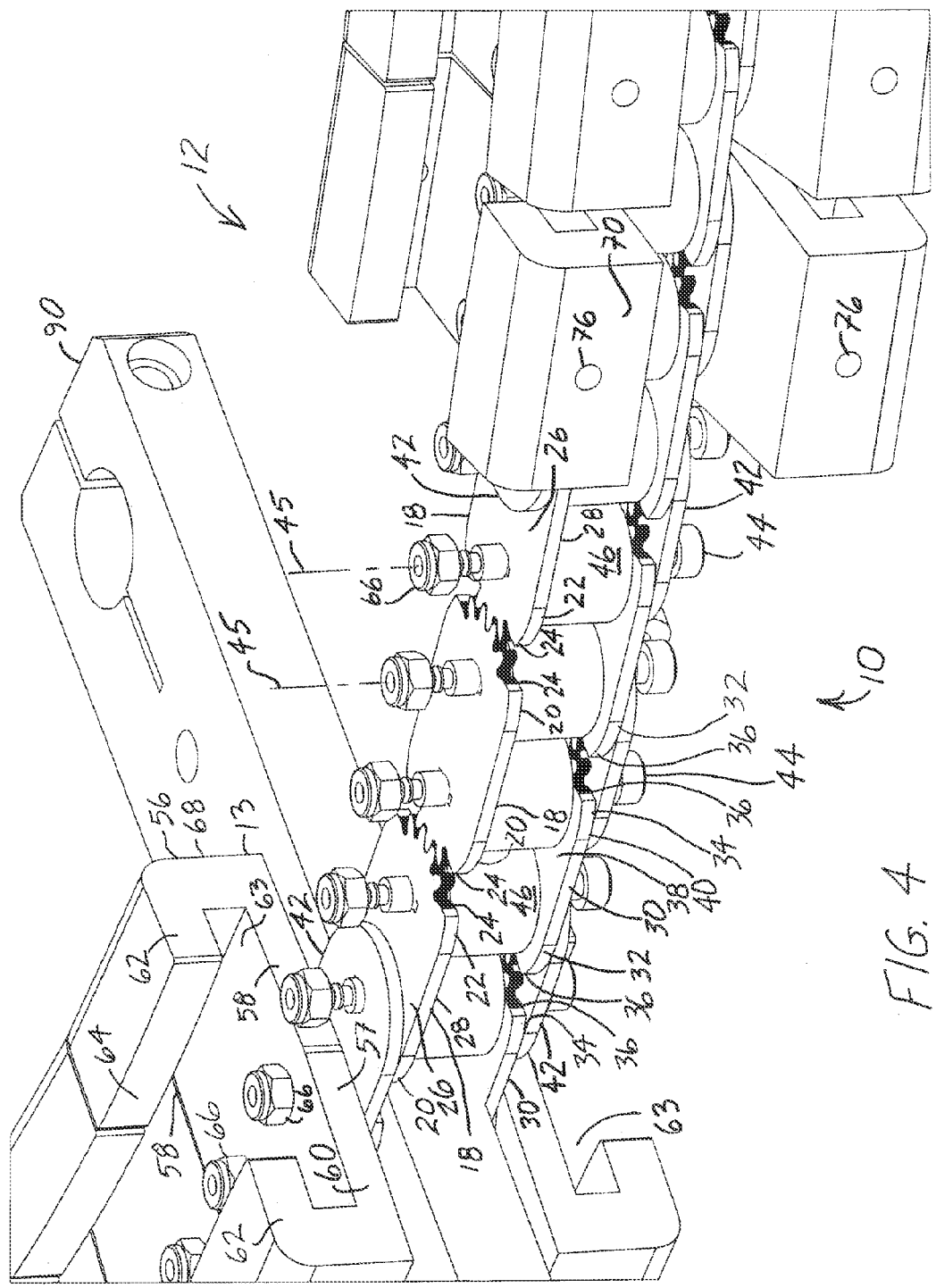
FIG. 4 illustrates a further partial cutaway, upper perspective view of the frame of FIG. 1.

As shown in FIG. 4, first links 18 overlap second links 30 such that an overlapping second end 22 of first link 18 rotatably receives the same fastener 44 as a corresponding third end 32 of a second link 30, and an overlapping first end 20 of a first link 18 rotatably receives the same fastener 44 as a corresponding fourth end 34 of a second link 30. As further shown in FIG. 4, for purposes of better understanding of the disclosure, and not intended to limit the disclosure, first links 18 include an upper facing or first surface 26 and an opposed lower facing or second surface 28. Similarly, for purposes of better understanding of the disclosure, and not intended to limit the disclosure, second links 30 include an upper facing or third surface 38 and an opposed lower facing or fourth surface 40. In this arrangement, at least a portion of the first surface 26 of the first link 18 and the fourth surface 40 of the second link 30 secures conveyor retainer or retainer 12 for supporting the continuous belt 16 (FIG. 2).

Optionally, as further shown in FIG. 4, plates or tertiary links 42 may be positioned facing first surface 26 of first link 18, facing second surface 28 (not shown in FIG. 4) of first link 18 or a combination thereof. As shown in FIG. 4, plates or tertiary links 42 in close proximity to first link 18 are positioned in axial alignment with corresponding second links 30. Similarly, plates or tertiary links 42 may be positioned facing third surface 38 of second link 30, facing fourth surface 40 (not shown in FIG. 4) of second link 30 or a combination thereof. As shown in FIG. 4, plates or tertiary links 42 in close proximity to second link 30 are positioned in axial alignment with corresponding first links 18. Optionally, as shown in FIG. 4, spacers 46 may be positioned between first links 18 and second links 30. Spacers 46 and tertiary links 42, while optional, can provide additional structural support for the articulating frame. As further shown in FIG. 4, spacers 46 may be cylindrically shaped, and composed of a suitable material, such as DELRIN®, a registered trademark owned by E. I. Du Pont De Nemours And Company of Wilmington, Del.

In one embodiment, first surface 26 of first link 18 defines a substantially coplanar surface. In another embodiment, fourth surface 40 of second link 30 defines a substantially coplanar surface. Irrespective the arrangement, first surface 26 and/or fourth service 40 directly supports or indirectly supports, via tertiary link 42, retainer 12 which slidably secures continuous belt 16 (FIG. 2).

By virtue of the arrangement of first links 18 and second links 30, as shown in FIGS. 10, 10A, 10B, 10C, 10D, the operation of the articulating frame is further discussed. As a point of reference, a block 48, such as corresponding to a fixed or non-articulating portion of the conveyor frame is utilized. Opposed slots 50 are formed in block 48 to receive a respective first link 18A and second link 30, first link 18A being similar to first link 18 as previously shown, although lacking a first end 20, but including a second end 22 having an engagement feature 24. By virtue of the overlapping arrangement between first links 18A, 18B and second links 30B, 30C, in response to a rotational movement 54, the orientation of the respective links 18, 30 are discussed. It is to be understood that the limit of angular movement about respective axes 45, 45A, 45B, 45C relates to retention members 13, which will be further discussed below. However, for purposes of discussion, a maximum angular movement of 2× degrees is associated with each adjacent pair of fastener axes, such as between axis of rotation 52A associated with axes 45 and 45A versus axis of rotation 52C associated with axes 45B and 45C.

For example, in response to rotational movement 54, by virtue of first link 18A being fixed to immobile block 48, the orientation of first link 18A, as indicated and measured through openings formed in the links is 52A, which is parallel to the centerline axis defined by cover 50 of block 48, and corresponding to zero degrees of rotational movement. However, in response to rotational movement 54, second links 30A and 30B are each urged into rotational movement 54B about respective axes 45, 45A in the amount of X degrees away from orientation 52A (or axis of orientation 52B), due to engagement feature 36. By virtue of rotational movement of second link 30B about axis 45A, overlapping first link 18B that is adjacent to first link 18A and engaged to overlapping first link 18A by engagement feature 24, is urged into additional rotational movement 54C about axis 45B in the amount of X degrees, so that axis of orientation 52C of overlapping first link 18B between axes 45B and 45C is 2× degrees away from reference axis 52A. By virtue of rotational movement of first overlapping first link 18B about axis 45B (as measured and indicated by axis 52C), second overlapping second link 30C which is adjacent to second link 30B and engaged to link 30B by engagement feature 36, is urged into additional rotational movement 54A about axis 45C in the amount of X degrees, so that axis of orientation 52D of second link 30C between axes 45C and the center of the opening formed in second link 30C (designated as 45D) is 3× degrees away from reference axis 52A. One having ordinary skill in the art will understand that similarly positioned additional first links (18C, 18D, etc.) and additional second links (30D, 30E, etc.) that collectively extend the arrangement of the frame portion described above will similarly uniformly increase the angle or angular orientation from reference axis or angular orientation 52A and are not further discussed herein.

In another embodiment, instead of a block 48, in which one or more of the links are fixed or are configured to secure the links in response to a rotational movement, an actuator or other force generating device (not shown) could be utilized, such as to generate a force 59 (FIG. 10D) substantially perpendicular to the opening adjacent to the opening formed in second link 30A in order to control positioning of the articulating frame. In one embodiment, articulation of the frame may occur during operation of the conveyance system, irrespective the use of an actuator, or by use of manual application of rotational movement, such as rotational movement 54. In another embodiment, in which the links may be urged into rotational movement by application of force 59 as previously discussed, it can be appreciated by one having ordinary skill in the art that a continuous belt 16 (FIG. 2) could be used to drivingly move the conveyance system (not shown). That is, one or more belts could be used as a tracked vehicle to drivingly move or propel the tracked vehicle. In one embodiment, a belt having a single articulating frame could drivingly move and guide a tracked vehicle, such as a snowmobile. In a further embodiment, multiple sections of the articulating frame may be used to permit segmented control to achieve a serpentine profile, such as by rotation of section(s) in opposite directions about one or more axes 45, 45A, 45B, 45C, 45D, etc. In yet a further embodiment (not shown), the multiple sections of the articulating frame may be connected to each other to form a continuous arrangement, or in another embodiment (not shown), multiple sections of the articulating frame may be separate from each other.

As shown in FIG. 11, articulating frame 210 is similar to articulating frame 10. Articulating frame 210 includes first links 218 having opposed surfaces 226, 228 (surface 228 labeled but not shown in FIG. 11), and second links 230 having opposed surfaces 226, 228 (surface 228 labeled but not shown in FIG. 11). As further shown in FIG. 11, surface 226 of first link 218 and surface 238 of second link 230 face the same direction, and surface 228 of first link 218 and surface 240 of second link 230 each face in the opposite direction. As further shown in FIG. 11, for purposes of better understanding of the disclosure, and not intended to limit the disclosure, surfaces 226, 238 and opposing surfaces 228, 240 are substantially parallel to rotational axes 45. That is, in one embodiment, surfaces 226, 238 and opposing surfaces 228, 240 may be used in an application not related to conveyance systems, as such surfaces providing frame 218 with prehensile (grasping) properties in response to rotational movement of links 218, 230 in one rotational direction about axes 44 as previously discussed. In another embodiment, links 218, 230 may be urged into rotational movement by application of force(s) similar to force 59 as previously discussed in FIG. 10D.

Figure 6:
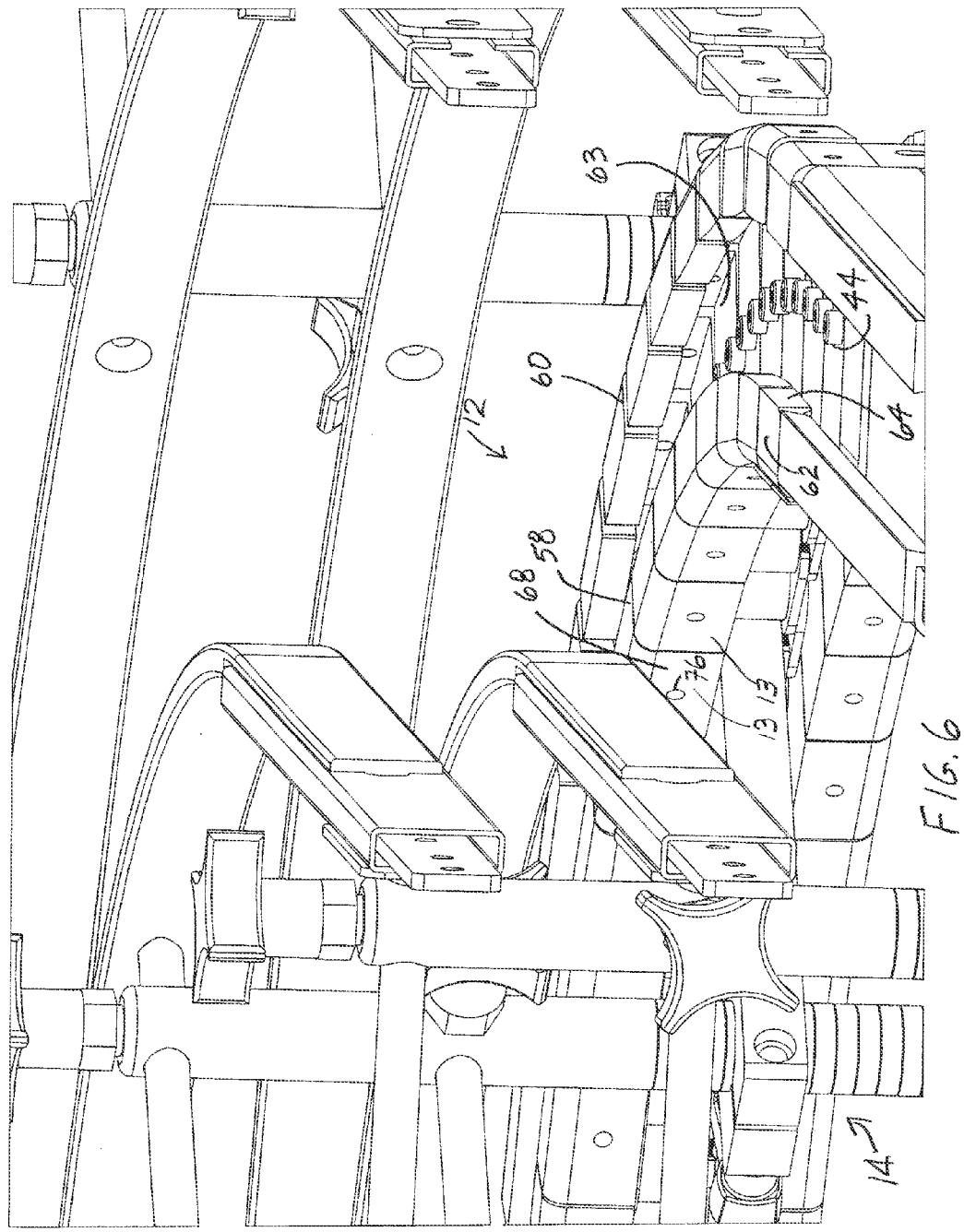
Figure 7:
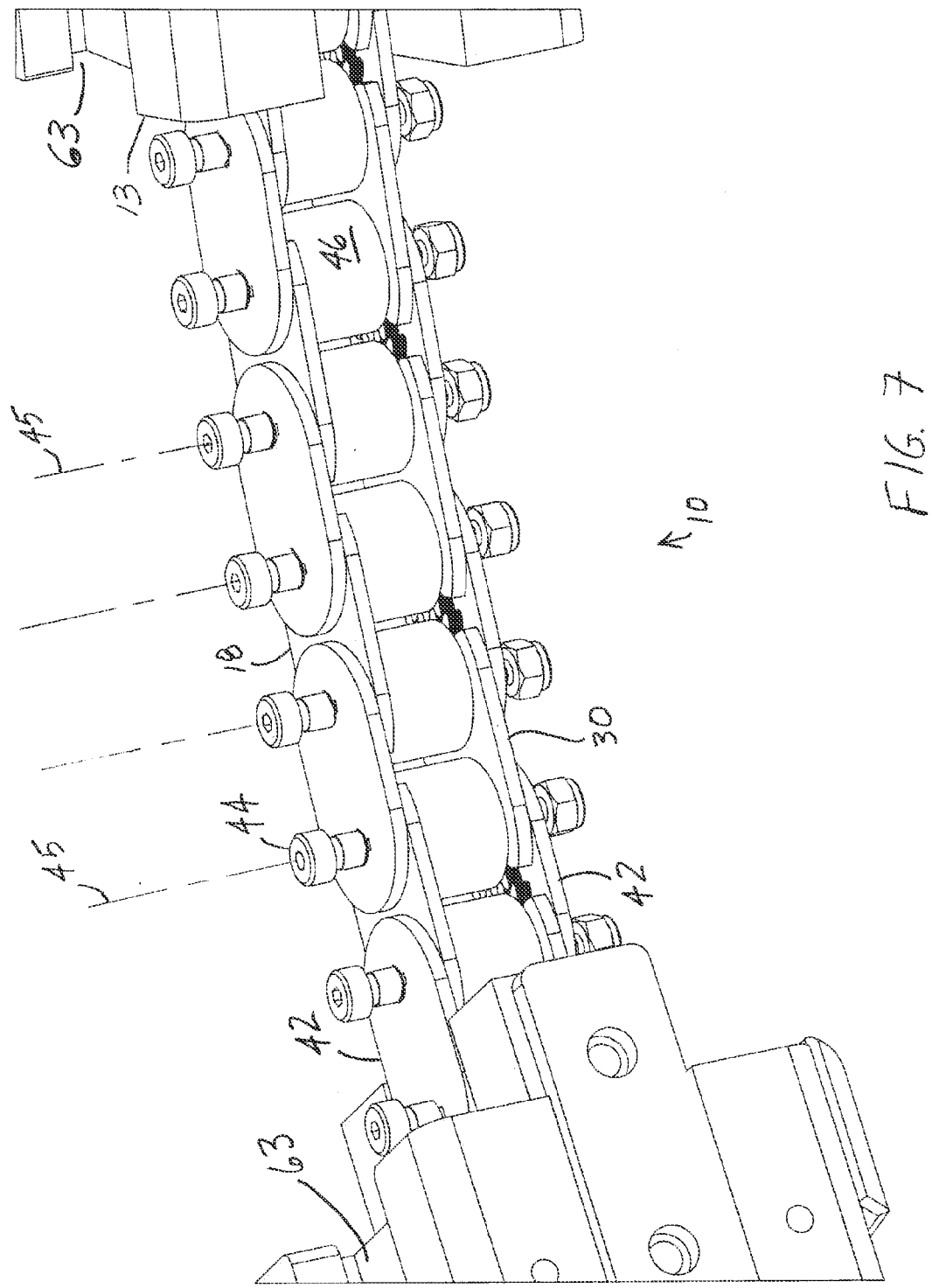
FIG. 7 illustrates a partial cutaway, upper perspective view of an exemplary embodiment of an articulating frame of FIG. 1.
Figure 8:
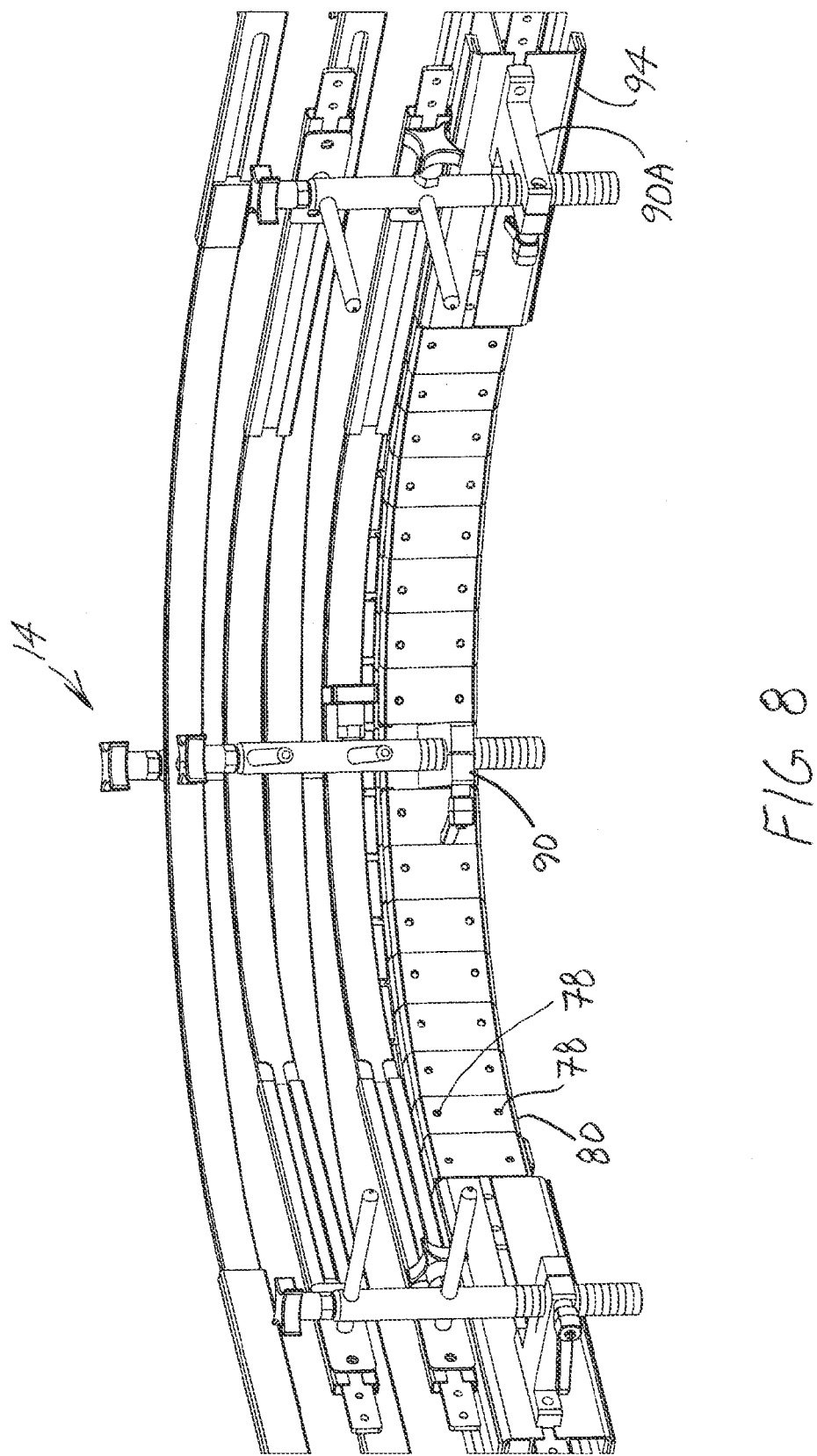
FIGS. 8-9 illustrate different views of an exemplary embodiment of a protective cover usable with the frame of FIG. 1.

Whether being supported by an exemplary articulating frame, such as discussed above, or by a strip of material (not shown), such as spring steel or other suitable material that provides structural support as well as movement along a planar surface, as shown in at least FIGS. 1-4 and 8-9, conveyor retainer or retainer 12 includes a plurality of retention members 13 (best shown in FIGS. 1, 4, 6). Retention member 13 includes a body 56 having a receiving surface or receiving portion such as a first tapered portion 58 terminating at an end 68 of the retention member and a receiving surface or receiving portion such as a second tapered portion 60 terminating at the other end 70 of the retention member. In an exemplary embodiment, retention member 13 can include a receiving surface extending from a first tapered portion 58 at one end 68 of the retention member to a second tapered portion 60 at the other end 70 of the retention member. In a further exemplary embodiment, adjacent retention members 13 can each have a corresponding receiving surface that can be brought toward each other, irrespective the direction of rotational movement 74 (FIG. 2), or a rotational movement in a direction opposite to rotational movement 74. In another embodiment, at least a portion of first and second tapered portions 58, 60 can include a curved profile, although in a further embodiment, first and second tapered portions 58, 60 can define a substantially linear profile. Opposed flanges 62 extend outwardly from a base 57 of body 56, with flanges 62 extending to facing protruding surfaces 64. A channel 63, is formed in body 56, which channel being defined by base 57, flanges 62 and protruding surfaces 64. Facing protruding surfaces 64 provide access to channel 63 from exterior of body 56.

As further shown in the FIG. 2, a pair of apertures 66 are formed through base 57 of body 56 of retention member 13 between first tapered portion 58 and second tapered portion 60 to receive fasteners 44. In one embodiment, as is shown in FIGS. 2 and 4, the pair of apertures 66 are connected by a line 71 extending through the center of each of the pair of apertures 66, which line 71 being tangent to the centerline of the curve defined by articulating frame 10 for each retention member 13. In one embodiment, first tapered portion 58 and second tapered portion 60 of retention member are symmetric about line 71 and being substantially coincident with a minor axis of each retention member 13, substantially bifurcating the retention member. In an exemplary embodiment such as further shown in FIG. 2, line 72A, which is transverse to line 71, is substantially coincident with a major axis of each retention member 13 and with a base 90 of guide member assembly 14. As will be discussed in greater detail below, guide member assembly 14 (FIG. 1) makes use of the centerline tangency in order to operate as intended.

Figure 5:
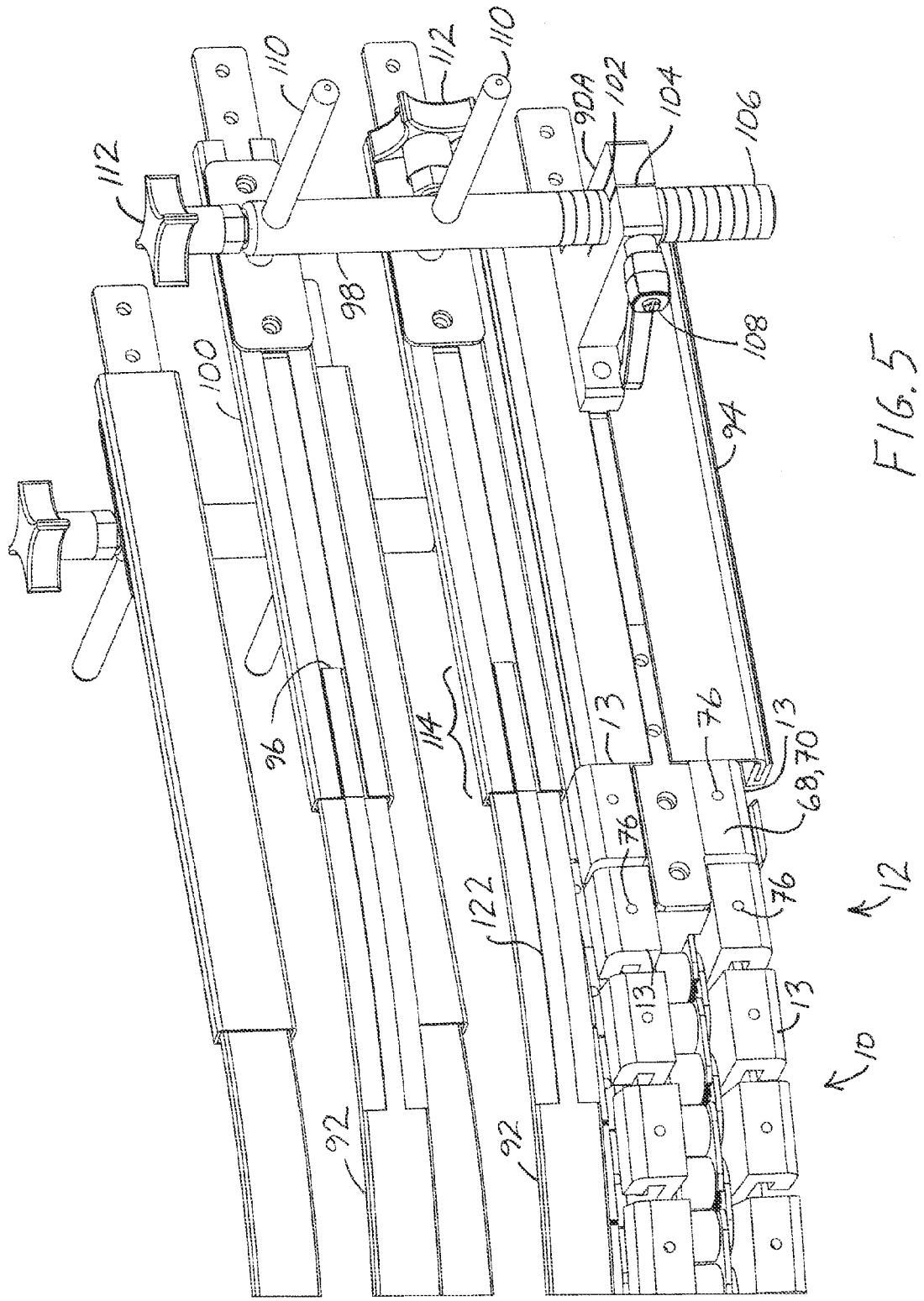
FIGS. 5-6 illustrate different views of an exemplary embodiment of a guide assembly usable with the frame of FIG. 1.

As shown in at least FIGS. 2, 4 and 6, operation of retention members 13 of conveyor retainer or retainer 12 is now described. In response to sufficient rotational movement 74 of opposed ends of portions or segments of articulating frame 10 in one direction, which in one embodiment may define an angle of up to 90 degrees, or exceed 90 degrees in another embodiment, either first tapered portion 58 or second tapered portion 60 (each tapered portion also referred to as a receiving surface or a receiving portion) of adjacent retention members 13 will be urged toward and into abutting contact with each other. That is, rotational movement may be as shown in FIG. 2, or opposite the rotational movement as shown in FIG. 2. For example, as shown in FIG. 2, receiving surfaces or receiving portions or first tapered portions 58 of adjacent retention members 13 contact each other. In this position, in which receiving surface or receiving portion or first tapered portions 58 of adjacent retention members 13 are urged into contact with each other, adjacent protruding surfaces 64 of flanges 62 adjacent to the abutting receiving surfaces or receiving portions or tapered portions 58, 60 (FIG. 6 shows first tapered portion 58 into abutting contact) form or define a substantially continuous bearing surface with the continuous conveyor belt over the segment of the articulating frame. Further, the substantially continuous bearing surface, such as shown in FIG. 6, forms a curved surface. In one embodiment, surfaces 64 may individually define a curved profile. In yet another embodiment, surfaces 64 may define a curved profile having substantially similar radii, providing a substantially smooth and uniform radial surface when receiving surfaces or receiving portions or tapered portions are brought into contact with each other. As shown in FIGS. 4-6, retention members 13 are positioned both above and below articulating frame 10. The continuous belt 16 (FIG. 2) is supported in channels 63 of respective retention members 13, with the continuous belt extending through channels 63 in the "upper" retention members and also through the "lower" retention members in forming the continuous belt. It is to be understood that relative positional terms, such as upper, lower, vertical and the like are provided for purposes of better understanding of the disclosure, and not intended to limit the disclosure. As further shown, the upper and lower retention members are aligned with each other along the articulating frame. However, such alignment of the upper and lower retention members along the articulating frame is not required.

Figure 9:
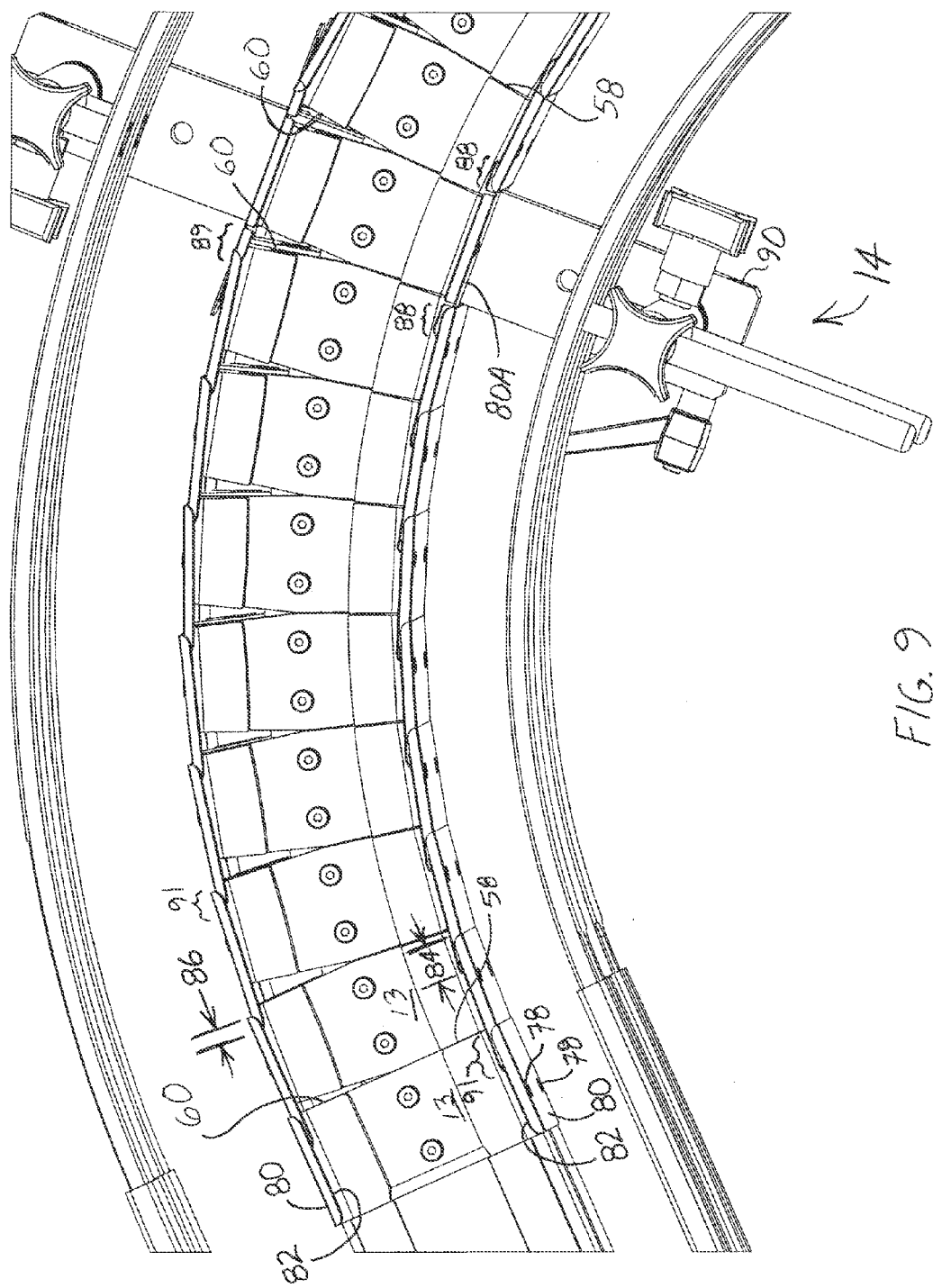

As shown in FIGS. 4-6 and 8-9, openings 76 are formed in the ends 68, 70 of respective terminated first and second tapered portions 58, 60 of retention members 13 in order to receive fasteners 78 for securing protective covers 80 over the ends. That is, depending upon the rotational movement associated with the articulating frame, a variable spacing between adjacent ends 68, 70 may occur during operation of the conveyor system, which conveyor system being configured to permit continual operation or driven movement of the continuous belt, even during adjustment, or articulation of the articulating frame. To minimize the opportunity for damage to personnel or equipment, covers 80 include a slidable portion 91 between adjacent covers 80. Slidable portion 91 provides an overlapping region between adjacent covers 80 that varies in size between a first overlap 84, when surfaces of tapered portions 58, 60 of respective ends 68, 70 of adjacent members 13 are in abutting contact with each other, and a second overlap 86, when surfaces of tapered portions 58, 60 of respective ends 68, 70 of adjacent members 13 are spaced at a maximum distance from each other. For example, FIG. 9 shows surfaces of first tapered portions 58 in abutting contact with each other. To provide further protection, covers 80 include tabs 82 that extend over opposed edges or corners of ends 68, 70 of both upper and lower members 13. As shown in at least FIGS. 4 and 9, in the circumstance in which a base 90 of guide assembly 14 extends through the articulating frame (which will be discussed in further detail below), and replacing spacers 46 such as shown in FIG. 4, a cover 80A accommodates base 90, and includes an opposed pair of respective third and fourth overlaps 88, 89 that provide coverage over ends 68, 70 associated with tapered surfaces 58, 60.

As shown in FIGS. 1-3 and 5, guide assembly 14 is usable to guide articles along the articulating frame that have been brought into driven movement by the conveyor belt. As further shown FIGS. 1, 2 and 4, guide assembly 14 includes bases 90 and 90A which are positioned along articulating portions and fixed portions of the conveyance system, respectively. That is, as shown, base 90 extends through a midpoint of an articulating portion of articulating frame 10, such as in place of spacers 46 (FIG. 4). In another embodiment, articulating frame 10 may include more than one base 90, in which neither base 90 is positioned at the midpoint of the articulating frame. Base 90A is secured to an axial portion 94, which axial portion 94 may be connected to other portions or segments of the conveyance system. Returning to FIGS. 2 and 4, base 90 is secured to frame 10 by fasteners 44, such as directed through a pair of apertures 66 formed in retention member 13, which fasteners being additionally utilized to secure links 18, 30, 42 together to form a chain. Pair of apertures 66 are connected by line 71 extending through the center of each of the pair of apertures 66, which line 71 being tangent to the centerline of the curve defined by articulating frame 10 for each retention member 13. In an exemplary embodiment, line 71 defines a centerline along the minor axis of base 90, bifurcating base 90. As further shown, line 72A defines a centerline along the major axis of base 90, line 72A being perpendicular to line 71. Base portion or base 90A is secured to axial portion 94 having a fixed centerline 71A. Line 72B defines a centerline along the major axis of base 90A, line 72B being perpendicular to line 71A.

As a result of the arrangements of each of bases 90, 90A as described above, the centerlines along the major axes of respective bases 90, 90A are maintained perpendicular to the centerline of the articulating frame, irrespective of the position or amount of bend formed in the articulating frame. Additionally, this arrangement permits a uniform spacing to be maintained between guide members 92 that form a part of and are supported by the guide assembly 14. As further shown in FIGS. 1-6, guide assembly 14 includes bases 90, 90A for securing guide supports 98, such as posts that support guide members 92. As shown, bases 90, 90A include an opening 102 for receiving guide support 98, which guide support 98 having a slot 104 formed in opening 102 to permit adjustment of the size of opening 102, such as by an adjustment/securing device 108 that includes, but is not limited to a ball-lock fastener, threaded fastener or other suitable device. As further shown in the figures, guide support 98 includes retention features 106 that may be engaged by features (not shown) formed in opening 102. Guide support 98 further includes one or more radial adjustment members 110 (two shown in FIG. 5) securable in the desired position by an adjustment/securing device 112, such as a knob having a threaded fitting. Radial adjustment member 110 supports a receiving feature 100 that adjustably receives an end 96 of guide member 92. As shown in FIGS. 5-6, end 96 of guide member 92 is slidably received by receiving feature 100, indicated by an overlap 114 between guide member 92 and receiving feature 100. An alignment or guide feature 122 formed in the ends 96 of guide member 92, such as a protrusion shown in FIG. 5, or a slot as shown in FIG. 6, or other suitable construction may be utilized.

As further shown in FIGS. 2 and 5, guide assembly 14 operation is now discussed. Due to the construction of bases 90, 90A as previously discussed, the bases are perpendicular to the centerline of the articulating frame, such as along respective centerlines 71 and 71A. Also as previously discussed for an exemplary embodiment, line 71 is substantially coincident along a minor axis with retention member 13. In addition, and also as previously discussed, the centerlines along the major axes of base 90, 90A (and retention members 13 as previously discussed with respect to line 72A), respective lines 72A and 72B are perpendicular to or transverse with the centerline of the articulating frame. As previously discussed for an exemplary embodiment, line 72A is substantially coincident along a major axis with retention member 13. As a result of this guide assembly construction, after the initial adjustment of the guide members 92 and guide member end receiving features 100, a uniform spacing between opposed members 92 may be easily established and maintained during operation of the conveyance system, permitting continuous operation of the system, even if the articulating frame is subjected to rotational movement 74. In one embodiment, automatic or self alignment or maintenance of the spacing between opposed guide members 92 is achieved by relative or sliding movement between ends 96 of the guide members and their respective guide member receiving features 100.

For example, as shown in FIG. 2, a spacing 116 may be set between one end of guide member 92 as secured in receiving feature 100 as supported by base 90A, and centerline 71A of axial portion 94, and a spacing 118 may be set between the end of the opposed guide member 92 as secured in receiving feature 100 as supported the opposed base 90A, and centerline 71A of axial portion 94, the sum of spacings 116 and 118 establishing a total spacing 120 between opposed guide members 92. As shown, centerline 72B of opposed bases 90A are aligned with radial adjustment member 110, such that movement of receiving feature 100 along either radial adjustment member 110 will correlate to a similar movement, or change in spacing between opposed guide members. Similarly, by virtue of guide member 92 as supported by opposed ends of base 90, correspondingly matching spacings 116, 118 totaling 120 may be set between the correspondingly opposed guide members 92 as secured and supported at the ends of base 90, and centerline 71 of the articulating frame. As shown, centerline 72A of opposed ends of base 90 are aligned with radial adjustment member 110, such that movement along either radial adjustment member 110 will correlate to a similar movement, or change in spacing between opposed guide members 92. In one embodiment, spacings 116 and 118 along the entire segment of the articulating frame are substantially the same, so that after initial adjustment of adjustment/securing devices 108, 112, the total spacing 120 should be substantially uniform along the entire segment of the articulating frame. With spacings 116 and 118 being substantially the same, there should be little or no need for subsequent adjustment of positions of adjustment members 110, irrespective the direction and extent (as permitted by the conveyor retainers 12) of rotational movement 74 (FIG. 2) along the articulating frame.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An articulating frame for supporting a continuous belt comprising:
    a plurality of fasteners each having an axis that is substantially parallel with each other;
    a first link of a plurality of first links, the first link having a first end and a second end, the first end configured to rotatably receive a fastener of the plurality of fasteners and the first end having an engagement feature formed therein, the second end configured to rotatably receive a fastener of the plurality of fasteners that is adjacent to the fastener rotatably received by the first end, and the second end having an engagement feature formed therein, the second end of a first link of the plurality of first links being engaged with a first end of an adjacent first link of the plurality of first links;
    a second link of a plurality of second links, the second link having a third end and a fourth end, the third end configured to rotatably receive a fastener of the plurality of fasteners and the third end having an engagement feature formed therein, the fourth end configured to rotatably receive a fastener of the plurality of fasteners that is adjacent to the fastener rotatably received by the third end, and the fourth end having an engagement feature formed therein, the fourth end of a second link of the plurality of second links being engaged with a third end of an adjacent second link of the plurality of second links;
    the plurality of first links overlapping the plurality of second links such that an overlapping second end of a first link of the plurality of first links rotatably receiving the same fastener of the plurality of fasteners as a corresponding third end of a second link of the plurality of second links, and an overlapping first end of a first link of the plurality of first links rotatably receiving the same fastener of the plurality of fasteners as a corresponding fourth end of a second link of the plurality of second links; and
    wherein the first link of the plurality of first links has a first surface and an opposed second surface, and the second link of the plurality of the second links has a third surface and an opposed fourth surface, the fourth surface facing away from the first surface of the plurality of first links;
    wherein at least a portion of the first surface of the first link of the plurality of first links and the fourth surface of the second link of the plurality of second links secures a conveyor retainer for supporting the continuous belt.

2. The frame of claim 1, further comprising a plurality of tertiary links pivotably overlapping facing first and second ends of adjacent first links of the plurality of first links, the plurality of tertiary links positioned along at least one of the first surface and the second surface of the plurality of first links, the plurality of tertiary links pivotably overlapping facing third and fourth ends of adjacent second links of the plurality of second links, the plurality of tertiary links positioned along at least one of the third surface and the fourth surface of the plurality of second links.

3. The frame of claim 1, wherein the conveyor retainer includes a plurality of retention members includes a body having a receiving surface.

4. The frame of claim 3, wherein the body includes a channel formed therein, the body including opposed flanges having facing protruding surfaces.

5. The frame of claim 4, wherein the protruding surfaces defining curves such that when the frame is articulated about the substantially parallel axes until adjacent receiving portions of retention members are brought into contact with each other, the protruding surfaces corresponding to contacting receiving portions define a substantially continuous surface to slidably support the continuous belt.

6. The frame of claim 5, further comprising a pair of opposed covers to cover ends of the receiving portions during articulation of the frame.

7. The frame of claim 6, wherein the covers have movable overlapping cover portions that are slidable between adjacent cover portions.

8. The frame of claim 1, wherein a spacer is positioned in abutting contact between at least a portion of the second surface of a first link of the plurality of first links and a third surface of a second link of the plurality of second links.

9. The frame of claim 1, wherein a guide assembly is secured to the frame, the guide assembly having opposed guide members configured to be maintained at a substantially uniform spacing from each other along the frame.

10. The frame of claim 9, wherein a guide assembly includes a base secured substantially perpendicular to the frame.

11. The frame of claim 1, wherein the continuous belt conveys items from one end of the frame toward the other end of the frame.

12. The frame of claim 1, wherein operation of the continuous belt drivingly moves the frame.

13. The frame of claim 12, wherein articulation of the frame between axial portions of the frame defines a curved profile.

14. The frame of claim 12, wherein articulation of the frame between axial portions of the frame defines a serpentine profile.

15. An articulating frame comprising:
a plurality of fasteners each having an axis that is substantially parallel with each other;
a plurality of first links having a first end and a second end, the first end configured to rotatably receive a fastener of the plurality of fasteners and the first end having an engagement feature formed therein, the second end configured to rotatably receive a fastener of the plurality of fasteners that is adjacent to the fastener rotatably received by the first end, and the second end having an engagement feature formed therein, the second end of a first link of the plurality of first links being engaged with a first end of an adjacent first link of the plurality of first links;
a plurality of second links having a third end and a fourth end, the third end configured to rotatably receive a fastener of the plurality of fasteners and the third end having an engagement feature formed therein, the fourth end configured to rotatably receive a fastener of the plurality of fasteners that is adjacent to the fastener rotatably received by the third end, and the fourth end having an engagement feature formed therein, the fourth end of a second link of the plurality of second links being engaged with a third end of an adjacent second link of the plurality of second links;
the plurality of first links overlapping the plurality of second links such that an overlapping second end of a first link of the plurality of first links rotatably receiving the same fastener of the plurality of fasteners as a corresponding third end of a second link of the plurality of second links, and an overlapping first end of a first link of the plurality of first links rotatably receiving the same fastener of the plurality of fasteners as a corresponding fourth end of a second link of the plurality of second links; and
wherein the first link of the plurality of first links has a fifth surface and an opposed sixth surface, and the second link of the plurality of the second links has a seventh surface and an opposed eighth surface, the fifth surface and the seventh surface of the links facing in substantially the same direction, and the sixth surface and the eighth surface of the links facing in substantially the same direction.

16. The frame of claim 15, wherein articulation of the frame between axial portions of the frame defines a curved profile.

17. The frame of claim 15, wherein articulation of the frame between axial portions of the frame defines a serpentine profile.

18. The frame of claim 15, wherein articulation of the frame between axial portions of the frame defines a prehensile profile.

19. A retention member for use with an articulating frame for supporting a continuous belt, the retention member comprising:
a body having a receiving surface and being securable to a frame movable between a first position and a second position, the body including a channel formed therein configured to support a continuous belt, the body including opposed flanges having facing protruding surfaces;
in response to the frame being moved toward the first position, receiving surfaces of adjacent bodies are brought toward each other, one side of facing protruding surfaces of adjacent bodies forming a first substantially continuous surface to slidably support the continuous belt;
in response to the frame being moved toward the second position, receiving surfaces of adjacent bodies are brought toward each other, opposite surfaces of facing protruding surfaces of adjacent bodies associated with the first position of the frame forming a second substantially continuous surface to slidably support the continuous belt.

20. The retention member of claim 19, wherein a guide assembly is securable to the frame, the guide assembly having opposed guide members configured to be maintained at a substantially uniform spacing from each other along the frame.

21. The retention member of claim 20, wherein the guide assembly includes a base securable substantially perpendicular to the frame.

22. The retention member of claim 20, wherein the substantially uniform spacing of the guide members is maintained during articulation of the frame about axes defined by a plurality of fasteners.

23. The retention member of claim 22, further including receiving features formed in guide supports configured to slidably receive opposed ends of the guide members during articulation of the frame.

24. The retention member of claim 22, wherein articulation of the frame defines an angle between axial portions of the frame up to greater than 90 degrees.

25. The retention member of claim 22, wherein articulation of the frame between axial portions of the frame defines a serpentine profile.

26. The retention member of claim 19, wherein the first substantially continuous surface and the second substantially continuous surface define a curved surface.

* * * * *